United States Patent

Deweerdt

[11] Patent Number: 5,348,353
[45] Date of Patent: Sep. 20, 1994

[54] POSITIVE QUICK-CONNECT TUBE LOCKING CONSTRUCTION WITH PREASSEMBLY RETENTION OF SPRING KEEPER

[75] Inventor: Kevin R. Deweerdt, Walled Lake, Mich.

[73] Assignee: Chrysler Corporation, Highland Park, Mich.

[21] Appl. No.: 160,137

[22] Filed: Dec. 2, 1993

[51] Int. Cl.⁵ .................. F16L 37/12; F16L 41/00
[52] U.S. Cl. ........................ 285/305; 285/319
[58] Field of Search ............ 285/305, 319; 123/469, 123/456, 470, 468

[56] References Cited

U.S. PATENT DOCUMENTS

| | | | |
|---|---|---|---|
| 2,699,915 | 1/1955 | Goepfrich | 285/305 |
| 3,753,582 | 8/1973 | Graham | 285/305 |
| 3,929,357 | 12/1975 | DeVincent et al. | 285/319 |
| 4,244,608 | 1/1981 | Stuemky | 285/305 |
| 4,600,221 | 7/1986 | Bimba | 285/305 |
| 4,844,515 | 7/1989 | Field | 285/305 |
| 4,993,390 | 2/1991 | Ono et al. | 123/468 |
| 5,040,512 | 8/1991 | Twilton | 123/468 |
| 5,046,765 | 9/1991 | Usui | 285/305 |
| 5,092,300 | 3/1992 | Imoehl et al. | 123/456 |
| 5,146,896 | 9/1992 | Imoeul et al. | 123/456 |
| 5,152,555 | 10/1992 | Szabo | 285/93 |
| 5,167,213 | 12/1992 | Bassler et al. | 123/456 |

FOREIGN PATENT DOCUMENTS

| | | | |
|---|---|---|---|
| 302674 | 2/1989 | European Pat. Off. | 285/305 |
| 1425470 | 11/1968 | Fed. Rep. of Germany | 285/305 |
| 974024 | 11/1982 | U.S.S.R. | 285/305 |

*Primary Examiner*—Eric K. Nicholson
*Attorney, Agent, or Firm*—Kenneth H. MacLean

[57] ABSTRACT

Connector construction for attachment of a tube to a conduit that has inlet fitting for reception of an end of the tube. The fitting has an opening normal to the inlet fitting to receive a U-shaped spring keeper in selected positions representing a preassembly position, an intermediate position, and an assembled position. Detents on arms of the spring keeper engage guide tracks in the wall of the opening to guide and yieldably hold the keeper in the three positions. Dog-leg ends of arms of the keeper secures the keeper and the tube in an assembled position in the inlet fitting. A semi-cylindrical opening formed in the keeper engages a collar or flanged portion of the tube to ensure that the tube is retained in its axially installed position.

4 Claims, 1 Drawing Sheet

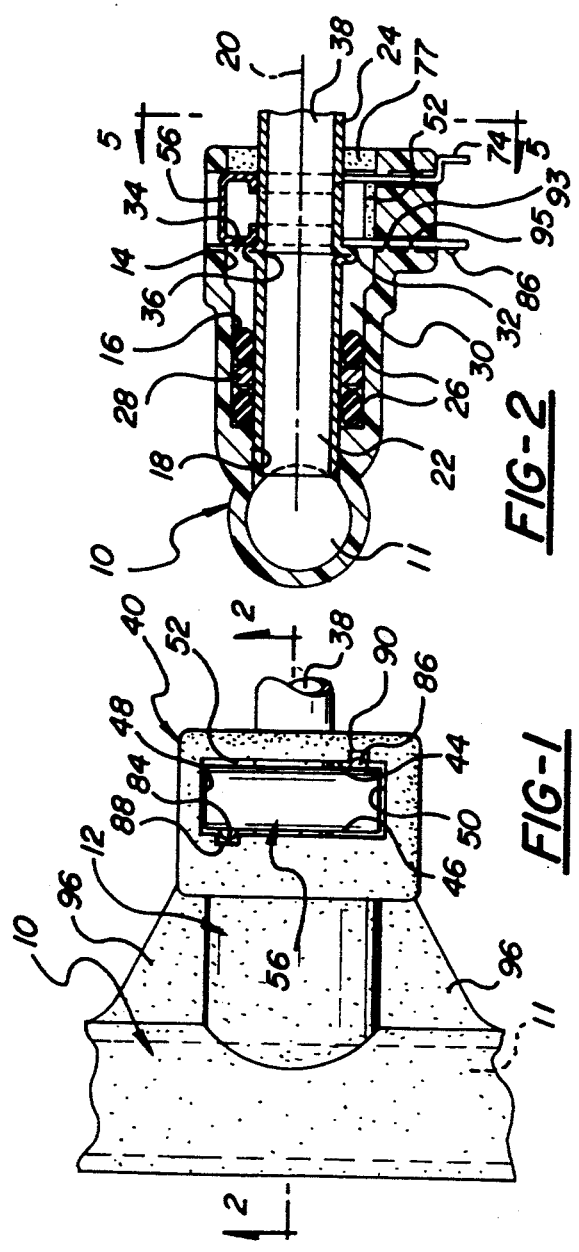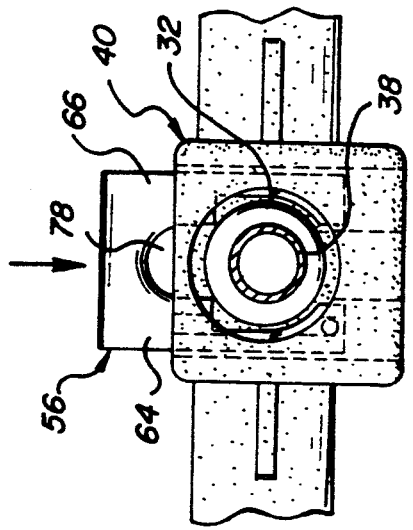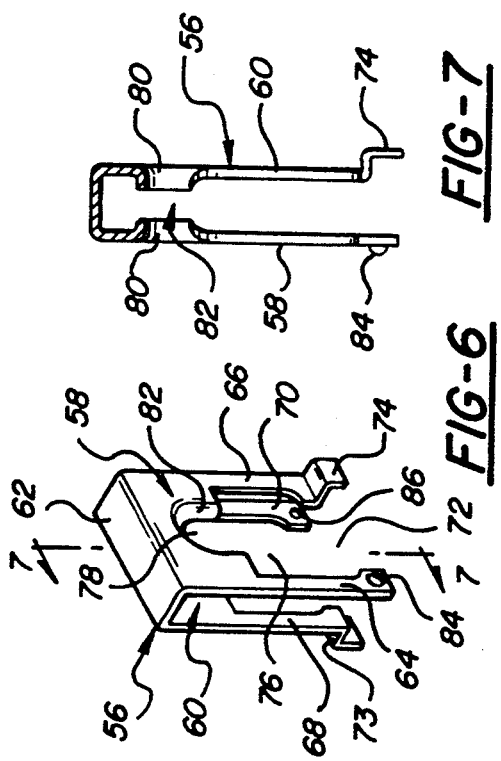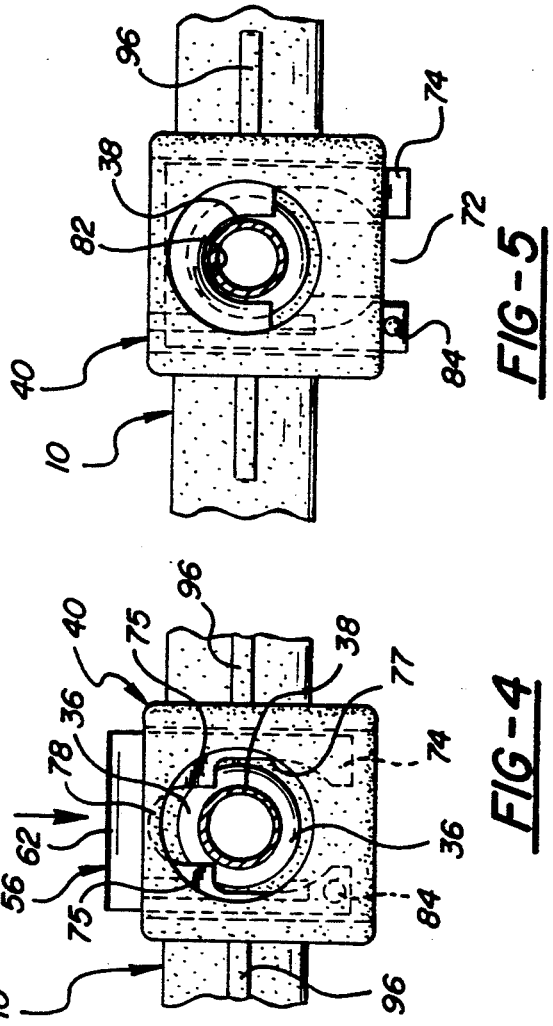

POSITIVE QUICK-CONNECT TUBE LOCKING CONSTRUCTION WITH PREASSEMBLY RETENTION OF SPRING KEEPER

BACKGROUND OF THE INVENTION

This invention relates to quick-connect locking arrangements for connecting tubing to tubing receptacles, and more particularly, to a new and improved locking construction for the positive, snap-in locking and fluid sealing of fluid conducting tubing to a fitting with a spring keeper.

DESCRIPTION OF RELATED ART

Prior to the present invention, various retention devices have been employed for operatively coupling fluid transmitting constructions to one another. For example, in U.S. Pat. No. 5,092,300, issued Mar. 3, 1992, couplings with special retention clips are employed to connect tubular fuel lines at the ends of fuel rails that are associated with fuel injectors which inject measured charges of fuel into the combustion chambers of an engine. A first clip construction connects the components together by spring arms which frictionally grip the fuel line and by a forked blade which fits into a receptacle in a rail housing. A second clip construction utilizes a threaded fastener instead of spring arms to positively retain the clip in an installed position. In U.S. Pat. No. 5,152,555, issued Oct. 6, 1992, an insertion indicator clip is used for the quick-connect of a pipe with a housing. The clip is provided with an indicator portion which visually advises the installer that the clip is in ready position for effecting the coupling of the pipe and housing.

The present invention is in the general category of the construction of the above identified patents but further advances the art by the provision of new and improved construction that provides for quick-connect coupling and assured locking of two fluid conductors together.

In this invention, a new and improved spring keeper is featured which is adapted to be maintained in a preassembled or prelocking detent position in one of the conductors and which allows the insertion of a terminal end portion of a fluid conducting line or pipe therethrough. Subsequently, the line is securely retained in a fluid tight position by displacing the spring keeper from a detent position to a locking position in which the two conductors are joined in a fluid tight manner. A snap-fit connection is provided in which legs of the spring keeper, loaded by the installation force, recover a position so locking portions thereof engage a lower end of a spring receiving housing to hold the spring keeper in a locked position. In the locked position, the line is securely held and a saddle portion of a small diameter opening of the spring keeper engages the outer surface of the pipe or tube and provides a wide contact surface that seats on the line without any cutting, marring, or abrasion thereof, while holding the line in the assembled position.

Another object of this invention is to provide a quick connect coupling that features an on-board spring keeper which allows the ready axial insertion of a collared or beaded tube through the keeper into a receptacle for the tube and which is displaced from an open position for tube insertion to a locked position in which the tube is locked by contact of collar with the spring keeper.

These and other features, objects and advantages of this invention will become more apparent from the following detailed description and drawing in which:

DESCRIPTION OF THE DRAWINGS

FIG. 1 is a top view of a portion of a fuel rail for an internal combustion engine and fuel feed tubing connected thereto;

FIG. 2 is a sectional view of the construction of FIG. 1 taken generally along sight line 2—2 of FIG. 1;

FIG. 3 is an end view taken generally along sight line 3—3 of FIG. 2 but showing parts in a preassembly position;

FIG. 4 is a view similar to that of FIG. 3 but showing parts moved from the FIG. 3 position;

FIG. 5 is a view similar to that of FIG. 4 but showing parts moved from the FIG. 4 position to a fully retained and locked position;

FIG. 6 is a pictorial view of a spring keeper of this invention; and

FIG. 7 is a sectional view taken generally along sight lines 7—7 of FIG. 6.

DETAILED DESCRIPTION OF THE DRAWINGS

Turning now in greater detail to the drawing, there is shown in FIG. 1 portion of a fuel rail 10 of suitable plastics material and having an internal passage 11 for feeding fuel to the fuel injectors of an internal combustion engine, not shown. The rail 10 is molded or otherwise formed with a laterally extending connector body 12 having stepped diameter internal walls 14, 16, 18, similar to counter bores in machined constructions, extending around a lateral axis 20 which is normal to and intersects the longitudinal axis of passage 11.

These stepped diameter walls provide a receptacle for receiving the large diameter and terminal end 22 of a metallic fuel feed line 24 which has been inserted therein and connected thereto. A pair of elastomer O-rings 26 separated by washer 28, are housed within the receptacle provided by the connector body for annular fuel sealing contact with the outer diameter of the end of the fuel feed line and internal walls 16 of the receptacle. Also a cylindrical, stepped outer diameter fuel line guide and O-ring retainer 30 is housed in the receptacle as shown in FIG. 2.

More particularly, the large diameter head portion 32 of the retainer 30 seats on an annular shoulder of the connector body and the outer end surface 34 of the head portion provides a stop surface for an annular bead or collar portion 36 formed in the fuel feed line 24. The bead also separates and defines the large outer diameter terminal end portion 22 and the smaller outer diameter supply portion 38 of the line 24.

The connector body 12 has at its terminal end a enlarged box like or rectilinear spring retaining head portion 40 with internal front and rear walls 44 and 46 and opposing side walls 48 and 50. The walls define a transverse opening 52 for receiving a spring keeper 56 of a resilient metal. The spring keeper is a thin wall member generally U-shaped in side view that has forward and rearward face sections 58, 60 joined by a top arch portion 62. Each face section is respectively formed with laterally spaced spring arms 64, 66 and 68, 70 as best shown in FIG. 6.

According to the preferred embodiment of this invention, the arms of each pair of arms are laterally spaced to define an entrance opening 72 that leads into an enlarged fuel line receiving opening 76 that is dimension to allow the terminal end and the bead or collar portion 36 of to be inserted into the receptacle when the spring keeper is in the preassembly position of FIG. 3. More particularly in this "on board" spring keeper position, the terminal end of the fuel line can be axially inserted into the receptacle provided by the connector body without any interference by the spring keeper since the large diameter opening 76 in the spring keeper is in alignment with the large diameter opening 77 formed in the rectilinear head portion 40 and with the receptacle of the connector body.

The front and rear pairs of spring arm further define an upper, semi-circular fuel line retainer opening 78, communicating with large diameter opening 76, having a curvature that corresponds to the outer diameter and curvature of the supply portion 38 of fuel feed line 24. The edges of opening 78 are rolled or otherwise turned inwardly toward one another form a saddle 82 and a smooth contact surface which will not mar or cut into the fuel pipe when the spring keeper is displaced into the locked position, as shown in FIGS. 2 and 5.

The ends of spring arms 64 and 70 of the keeper are formed with projecting detents 84 and 86 near the ends thereof which are adapted to ride in elongated guide slots or tracks 88 and 90 respectively provided in the walls 46 and 44, as best shown in FIG. 1.

A preassembly position is established when the U-shaped spring keeper is initially positioned in the transverse opening 52 and moved to a first position as shown in FIG. 3. The fuel rail with the spring keeper installed in the transverse opening 52 can be shipped as a sub-assembly to an assembly station at which the fuel rail can be operatively connected to the engine and the fuel feed line can be readily inserted into and connected into the receptacle of the connector body 12. Since the large diameter opening 76 of the spring keeper is aligned with the receptacle, the terminal end of the fuel line can be readily inserted into the receptacle provided by the connector body.

The spring keeper 56 can then be manually or otherwise displaced with guidance provided by the detents and tracks from the FIG. 3 to the FIG. 4 position in which opposing edge portions 75 of the openings of the spring are moved into a blocking position with respect to bead 36. However, the full connection of the fuel line to the rail is not completed.

After insertion to the FIG. 4 position, the upper or arched portion 62 of the spring keeper, being exposed, provides an indicator to show that a positive connection has not been made. Accordingly, a manual or mechanical installation force "F" is applied to the installation pad provided by the upper portion of the arched portion 62, as indicated, to effect the displacement of the keeper from the FIG. 4 position to the locking position shown in FIGS. 2 and 5. On reaching the FIGS. 2 and 5 position, the keeper arms will spring outward to a locking position.

This occurs primarily because end portions 73, 74 of the compressively loaded arms 66 and 68 respectively are doglegged and on load removal recover to an outer position beneath the lower edges of the head portion 40 of the connector body to thereby lock the fuel feed line in the receptacle formed in the connector body. With this locking, the fuel feed line is positioned in a fuel feed position into the connector body and is securely and positively locked thereto so that the fuel can be fed through the line into the fuel rail without leakage. The arcuate saddle 82 now in retention contact with the fuel feed line prevents any wear cutting of this tubing by vibratory or other relative movement between the tubing and the receptacle therefor. In the locked position, the close fit of the cylindrical terminal end 22 of the fuel line 24 in the stepped diameter wall 18 of the receptacle and in the laterally spaced fuel line guide and O-ring retainer 30 sharply reduces relative movement and wear of the line.

In the preassembly position, the detents 84, 86 on arms 64, 70 respectively contact upper projections in the tracks, such as projection 93, to establish the preassembly position. By displacing the spring keeper from the FIG. 3 position, the detents ride over the upper projection and contacts a lower projection 95 to establish the feed line holding position. However, the arch extending above the spring housing 40 indicates that a locked connection has not been made. Subsequently, force "F" applied to the arched pad of the spring keeper 56 causes the arms to deflect and ride over the lower projection 95 until the FIG. 5 snap-in locking position is obtained.

Quick keeper spring removal and conduit disconnect is provided by squeezing the spring arms together and manually removing the spring keeper from housing 40. On such removal, the fluid conductors can be readily separated.

The angular ribs 96 shown in FIGS. 1 and 3 are strengthening ribs to securely connect the body to the fuel rail and are molded at the time the fuel rail and its connector body are formed.

While a preferred embodiment of the invention has been shown and described, other embodiments will now become apparent to those skilled in the art. Accordingly, this is invention is not to be limited to that which is shown and described by the following claims.

What is claimed is:

1. Quick connect locking and fluid sealing construction for connecting fluid tubing to a primary member having a main fluid conducting passage therein, said primary member having an extension with an open end receptacle therein operatively communicating with said main passage, said tubing having an axis, a cylindrical connector portion, and a collared end extending outwardly of the diameter of said connector portion and spaced from the terminal end thereof, said connector portion of said tube having a head portion with an opening therein generally transverse to said axis, said opening in said head portion defined by wall means, a spring keeper having laterally spaced front and rear pairs of laterally spaced legs and defining an entrance opening at the lower end thereof and a large width opening communicating with said entrance opening and having a small width opening communicating with said large width opening, at least one of said legs having a detent associated therewith, track means in at least one of said wall means for receiving said detent means and for guiding said spring keeper to a detent stop position in which said large width opening is aligned with said opening in said head portion so that said collared end of said tubing can be inserted into said receptacle, said spring clip having an upper end for connecting said pairs of legs and for providing a contact to receive and installation force to displace said clip from said detent position to a fully installed and locked position in which said small width opening receives a portion of said tubing and said collar in said receptacle as said legs lock onto said head portion to prevent removal of said spring keeper and withdrawal of said tubing from said extension.

2. A quick connect locking and fluid sealing construction for connecting fluid conducting tubing to a fitting having a main fluid conducting passage therein, said fitting having a receptacle extending from said tubing with a tube receiving and fluid feed passage therein operatively communicating with said main passage, said tubing having a collar spaced from an end portion thereof, said fitting having an open end extending along an axis for receiving said collared end portion of said tube and a locking receptacle generally transverse to the axis of said open end of said receptacle, a spring keeper having laterally spaced front and rear pairs of laterally spaced legs and defining an entrance opening at the lower end thereof, each pair of said front and rear pairs of legs defining a large width opening communicating with said entrance opening and having a small width opening communicating with said large width opening, at least one of said legs having a detent associated therewith, track means in at least one of said wall means for receiving said detent means and guiding said spring keeper to a first detent stop position in which said large width opening is aligned with said open end of said fitting receptacle so that said collared end of said tubing can be inserted into the open end of said receptacle, said spring clip having an upper end for connecting said pairs of legs and for providing a pad to receive an installation force to displace said clip from said first detent position to a fully installed and locked position in which said small width opening receives said tubing and said collar as said legs lock onto the extension to prevent withdrawal of said tubing from said fitting.

3. A quick-connect locking and fluid sealing construction for connecting a fluid conducting tube to a primary member having a main fluid conducting passage therein, said primary member having an extension with a tube receiving receptacle therein extending around an axis and operatively communicating with said main passage, said tube having a large diameter collar spaced from an end thereof, said extension having a head portion with an open end for receiving said end portion of said tube and having a locking passage generally transverse to the axis of said open end of said receptacle, said locking passage defined by wall means having guide tracks therein, a spring keeper having laterally spaced front and rear pairs of laterally spaced legs and defining an entrance opening for receiving said tube at the lower end thereof, each pair of said front and rear pairs of legs defining a large width opening communicating with said entrance opening and having a small width opening communicating with said large width opening, at least one of said legs having a detent associated therewith for riding in said track means, said spring clip having an upper end for connecting said pairs of legs and for providing a contact to receive an installation force to displace said clip from a first detent position to a fully installed and locked position in which said small width opening receives said tubing and said collar, and retention means formed by the terminal ends of said spring arms to engage the lower end of said housing means to retain said spring in said locking position.

4. The construction of claim 3, and further including a saddle coinciding with said small diameter opening for direct engagement with said tubing and having a widened contact portion that has annular contact with said tube to prevent the abrasion thereof.

* * * * *